(12) United States Patent
Yokota et al.

(10) Patent No.: US 8,292,280 B2
(45) Date of Patent: Oct. 23, 2012

(54) DEVICE FOR DETECTING OPERATION OF CLAMP

(75) Inventors: Hideaki Yokota, Kobe (JP); Ryota Kojima, Kobe (JP)

(73) Assignee: Kosmek Ltd., Hyogo (JP)

( * ) Notice: Subject to any disclaimer, the term of this patent is extended or adjusted under 35 U.S.C. 154(b) by 529 days.

(21) Appl. No.: 12/527,835

(22) PCT Filed: Feb. 19, 2008

(86) PCT No.: PCT/JP2008/052725
§ 371 (c)(1),
(2), (4) Date: Aug. 19, 2009

(87) PCT Pub. No.: WO2008/102757
PCT Pub. Date: Aug. 28, 2008

(65) Prior Publication Data
US 2010/0066002 A1    Mar. 18, 2010

(30) Foreign Application Priority Data
Feb. 23, 2007 (JP) ................................. 2007-043864

(51) Int. Cl.
*B25B 1/06* (2006.01)
(52) U.S. Cl. ........ 269/254 R; 269/257; 269/53; 269/54; 269/32; 269/254 CS
(58) Field of Classification Search ............ 269/254 R, 269/257, 53, 54, 32, 24, 27, 254 CS
See application file for complete search history.

(56) References Cited

U.S. PATENT DOCUMENTS

| 3,572,216 | A | * | 3/1971 | Seesody | 92/33 |
| 3,577,682 | A | * | 5/1971 | Kulischenko | 451/78 |
| 4,240,620 | A | * | 12/1980 | Tunkers | 269/24 |
| 4,821,393 | A | * | 4/1989 | Spigarelli | 29/283 |
| 4,918,986 | A | * | 4/1990 | Warkotsch | 73/487 |
| 5,836,573 | A | * | 11/1998 | Hayashi et al. | 269/20 |
| 5,876,025 | A | * | 3/1999 | Yonezawa | 269/24 |
| 5,927,700 | A | * | 7/1999 | Yonezawa | 269/24 |

(Continued)

FOREIGN PATENT DOCUMENTS
JP    5087241 A    4/1993
(Continued)

OTHER PUBLICATIONS
Japanese Office Action for JP 2009-500185, dated Sep. 4, 2012.

*Primary Examiner* — George Nguyen
(74) *Attorney, Agent, or Firm* — Bacon & Thomas, PLLC

(57) ABSTRACT

A clamp rod (5) is vertically movably inserted into a housing (3), and a detection hole (58) is formed in a lower end wall (3*b*) of the housing (3), substantially concentrically with an axis of the clamp rod (5). An inlet hole (71, 72) for supplying compressed air is opened in a peripheral surface of the detection hole (58). Into the detection hole (58), a detection member (62) is fitted vertically movably, the detection member (62) having a closing surface (68) which closes an opening portion (71*a*, 72*a*) of the inlet hole (71, 72), and a recessed portion (69) through which the opening portion (71*a*, 72*a*) is communicatively connected to outside air. The detection member (62) is connected to a downward projecting portion (5*a*) of the clamp rod (5). The detection member (62) is urged by an elastic member (91) toward the opening portion (71*a*, 72*a*).

4 Claims, 11 Drawing Sheets

U.S. PATENT DOCUMENTS

| | | | |
|---|---|---|---|
| 5,954,319 A * | 9/1999 | Yonezawa | 269/24 |
| 6,113,086 A * | 9/2000 | Yonezawa | 269/24 |
| 6,139,000 A * | 10/2000 | Price et al. | 269/71 |
| 6,736,384 B2 * | 5/2004 | Yokota | 269/32 |
| 6,929,254 B2 * | 8/2005 | Steele et al. | 269/24 |
| 7,111,834 B2 * | 9/2006 | Steele et al. | 269/24 |
| 7,144,003 B1 * | 12/2006 | Meade | 269/43 |
| 7,448,607 B2 * | 11/2008 | Steele et al. | 269/32 |
| 7,574,953 B2 * | 8/2009 | Tanaka | 92/136 |
| 8,087,650 B2 * | 1/2012 | Kuroda et al. | 269/306 |
| 2003/0151183 A1 | 8/2003 | Yokota | |
| 2009/0146356 A1 * | 6/2009 | Kuroda | 269/91 |
| 2009/0315239 A1 * | 12/2009 | Yonezawa et al. | 269/309 |

FOREIGN PATENT DOCUMENTS

| | | |
|---|---|---|
| JP | 2003-305617 | 10/2003 |
| JP | 2003-305626 | 10/2003 |
| JP | 2005054943 A | 3/2005 |

* cited by examiner

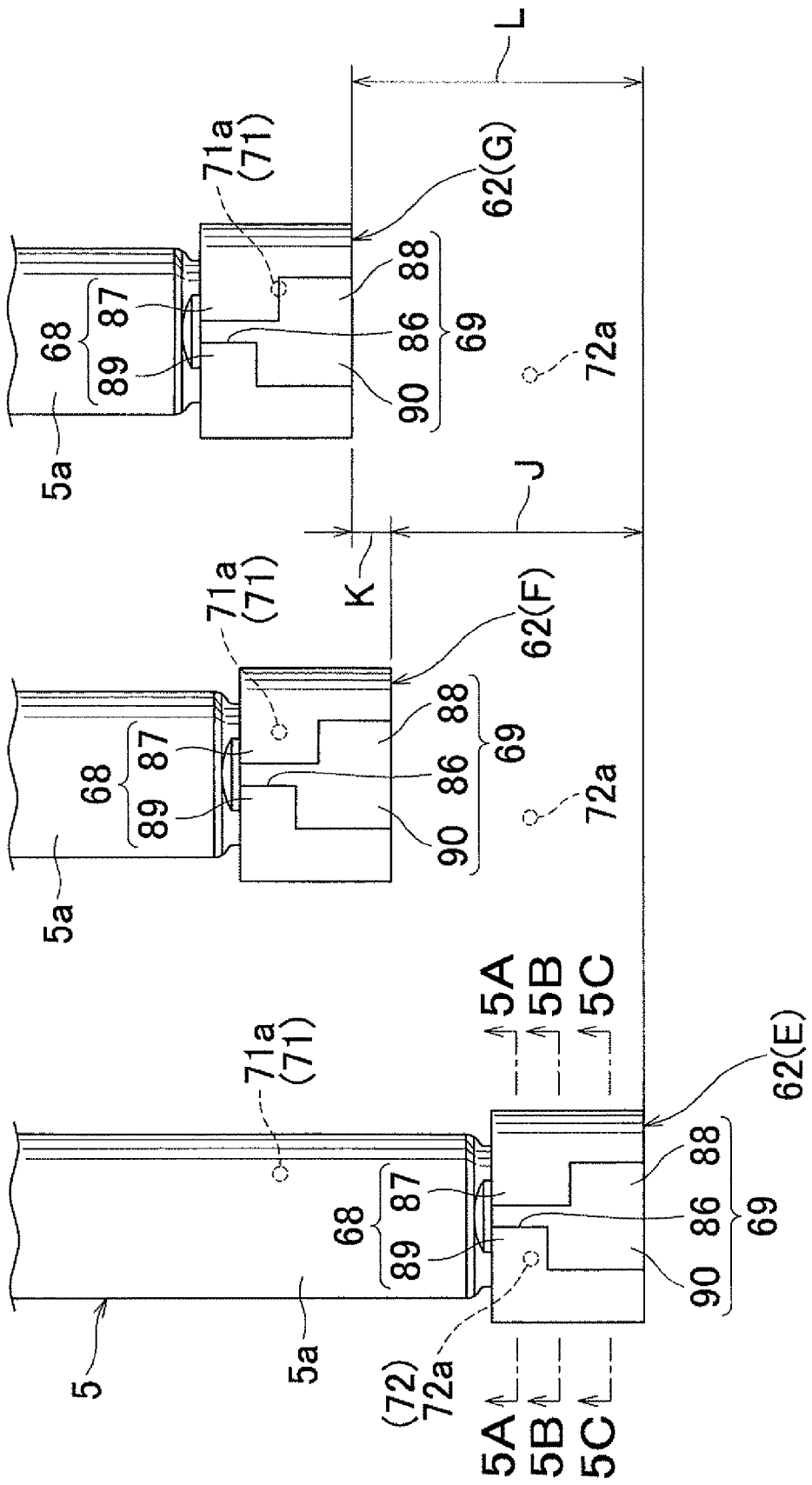

DEVICE FOR DETECTING OPERATION OF CLAMP

TECHNICAL FIELD

The present invention relates to a device which detects an operating state of a clamp for fixing a workpiece or the like.

BACKGROUND OF THE INVENTION

Among operation detecting devices of a clamp, there is a device including: a clamp rod axially movably inserted into a housing; a detection hole formed in a lower end wall of the housing, substantially concentrically with an axis of the clamp rod; and a detection member axially movably fitted into the detection hole (for example, see Patent Document 1). On an outer peripheral surface of the detection member, there are provided: a closing surface which closes an opening portion of an inlet hole for supplying pressurized fluid that is opened in a peripheral surface of the detection hole; and a recessed portion through which the opening portion is communicatively connected to outside air. When pressurized fluid is supplied to the inlet hole, there is a difference, in pressure thereof, between a case where the opening portion of the inlet hole faces the recessed portion of the detection member and a case where the opening portion is closed by the closing surface, and therefore, through detection of the pressure of the pressurized fluid, the operation detecting device detects an operating state of the clamp rod.
Patent Document 1: JP2003-305626A

SUMMARY OF THE INVENTION

Problem to be Solved by the Invention

The above-mentioned conventional art is advantageous in that the operating state of the clamp rod can be surely detected with a mechanically simple structure, however, there remains room for improvement, in the following respect.

For example, in the case where such a clamp is used over a long period of time or used with high frequency, at least one of the two members, which are the closing surface of the detection member and the peripheral surface of the detection hole, is worn, and a gap between them becomes larger.

In the case where the opening portion of the inlet hole is to be closed by the closing surface of the detection member but the gap has a size greater than an allowable value, a large amount of pressurized fluid leaks and pressure to be detected is lowered, which makes it impossible to accurately identify the operating state of the clamp rod. Particularly, in the case where a plurality of clamps each having a property that an amount of pressure reduction with respect to supply pressure is large are connected, pressure to be detected is extremely lowered, and therefore erroneous identification is more likely to occur.

This problem can be solved by making arrangements such that high pressure is detected when the opening portion of the inlet hole is closed by the closing surface of the detection member, however, in order to do so, the gap has to be kept within a narrow setting range. Therefore, it is necessary to improve machining accuracy at the time of manufacturing components and to strictly control component tolerance, but this leads to an increase in machining cost. Alternatively, there may be an option to control components stratified by tolerance, or the like, however, this results in a decrease in yield and an increase in machining cost.

An object of the present invention is to accurately detect an operating state of the clamp rod in a manner consistent with prevention of increase in machining cost.

Means for Solving the Problem and Effect

In order to accomplish the objective mentioned above, according to the present invention, for example, as illustrated in: FIG. 1 to FIG. 5C; FIG. 6 and FIG. 7; FIG. 8 and FIG. 9; and FIG. 10, an operation detecting device of a clamp is constructed as follows.

A clamp rod 5 is axially movably inserted into a housing 3. A detection hole 58 is formed in one end wall 3b of the housing 3 substantially concentrically with an axis of the clamp rod 5. An inlet hole 71 (72) for supplying pressurized fluid is opened in a peripheral surface of the detection hole 58.

A detection member 62 is axially movably fitted into the detection hole 58. The detection member 62 is laterally movable and has a closing surface 68 which laterally closes an opening portion 71a (72a) of the inlet hole 71 (72) and a communication portion 69 through which the opening portion 71a (72a) is communicatively connected to outside air.

An operation portion 5a is provided at one end portion of the clamp rod 5, the operation portion 5a being connected to the detection member 62.

The detection member 62 is urged by an elastic member 91 laterally toward the opening portion 71a(72a).

The present invention brings about the following function and effect.

For detecting clamp operation, pressurized fluid such as compressed air is supplied to the inlet hole. In the case where the opening portion of the inlet hole faces the communication portion of the detection member, the pressurized fluid supplied to the inlet hole is discharged through the communication portion, and pressure of the pressurized fluid is decreased below a set pressure. On the other hand, in the case where the opening portion of the inlet hole is closed by the closing surface of the detection member, discharge of the pressurized fluid is blocked and the pressure of the pressurized fluid is maintained at the set pressure. Accordingly, through detection of the pressure of the pressurized fluid, it is possible to detect a state into which the detection member has been switched, and as a result, the operating state of the clamp rod can be identified.

Here, the detection member is urged by the elastic member laterally toward the opening portion of the inlet hole. Because of this, even when at least one of the closing surface of the detection member and an inner periphery of the detection hole is worn, there is very little or substantially no gap formed between the closing surface and a vicinity of the opening portion in the peripheral surface of the detection hole, and the pressure to be detected with the opening portion of the inlet hole being closed is kept high, and therefore, the operating state of the clamp rod can be accurately identified.

Moreover, since there is very little or substantially no gap formed between the closing surface of the detection member and the vicinity of the opening portion in the peripheral surface of the detection hole, it is possible to keep the pressure high, which is detected in a state where the opening portion of the inlet hole is closed, without exerting strict control on component tolerance at the time of manufacturing components. Therefore, the operating state of the clamp rod can be accurately identified.

Thus, it is possible to accurately detect the operating state of the clamp rod in a manner consistent with prevention of increase in machining cost.

In the present invention, it is preferable that an urging force of the elastic member 91 is set to a value greater than a value of a pressure force of the pressurized fluid acting from the opening portion 71a (72a) onto the closing surface 68, and thereby the closing surface 68 is brought into contact with the detection hole 58. This allows the detection member to be smoothly moved while being pressed toward the opening portion.

Further, in order to accomplish the objective, according to another aspect of the present invention, for example, as illustrated in FIG. 11A and FIG. 11B (and FIG. 1), an operation detecting device of a clamp is constructed as follows.

A clamp rod 5 is axially movably inserted into a housing 3. A detection hole 58 is formed in one end wall 3b of the housing 3 substantially concentrically with an axis of the clamp rod 5. An inlet hole 71 (72) for supplying pressurized fluid is opened in a peripheral surface of the detection hole 58.

A detection member 62 is axially movably fitted into the detection hole 58. The detection member 62 has a closing surface 68 which closes an opening portion 71a (72a) of the inlet hole 71 (72) and a communication portion 69 through which the opening portion 71a (72a) is communicatively connected to outside air.

An operation portion 5a provided at one end portion of the clamp rod 5, the operation portion 5a being connected to the detection member 62.

The detection member 62 is a diametrically expandable and contractible collet, and is inserted into the detection hole 58 with the collet diametrically contracted, and thereby the closing surface 68 is pushed laterally toward the opening portion 71a (72a) by an elastic restoring force existing in the detection member 62 itself.

According to the other aspect of the present invention, the following function and effect are provided.

For detecting clamp operation, pressurized fluid such as compressed air is supplied to the inlet hole. In the case where the opening portion of the inlet hole faces the communication portion of the detection member, the pressurized fluid supplied to the inlet hole is discharged through the communication portion, and pressure of the pressurized fluid is decreased below a set pressure. On the other hand, in the case where the opening portion of the inlet hole is closed by the closing surface of the detection member, discharge of the pressurized fluid is blocked and the pressure of the pressurized fluid is maintained at the set pressure. Accordingly, through detection of the pressure of the pressurized fluid, it is possible to detect a state into which the detection member has been switched, and as a result, the operating state of the clamp rod can be identified.

Here, a force to push the closing surface toward the opening portion acts on the detection member, due to its own elastic restoring force. Because of this, even when at least one of the closing surface of the detection member and an inner periphery of the detection hole is worn, there is very little or substantially no gap formed between the closing surface and a vicinity of the opening portion in the peripheral surface of the detection hole, and the pressure to be detected with the opening portion of the inlet hole being closed is kept high, and therefore, the operating state of the clamp rod can be accurately identified.

Moreover, since there is very little or substantially no gap formed between the closing surface of the detection member and the vicinity of the opening portion in the peripheral surface of the detection hole, it is possible to keep the pressure high, which is detected in a state where to the opening portion of the inlet hole is closed, without exerting strict control on component tolerance at the time of manufacturing components. Therefore, the operating state of the clamp rod can be accurately identified.

Thus, it is possible to accurately detect the operating state of the clamp rod in a manner consistent with prevention of increase in machining cost.

In the other aspect of the present invention, it is preferable that the elastic restoring force of the detection member 62 is set to a value greater than a value of a pressure force of the pressurized fluid acting from the opening portion 71a (72a) onto the closing surface 68, and thereby the closing surface 68 is brought into contact with the detection hole 58. This allows the detection member to be smoothly moved while a part of the detection member is pressed toward the opening portion.

BRIEF DESCRIPTION OF THE DRAWINGS

FIG. 4A is a view taken along the line 4A-4A of FIG. 2, illustrating a detection member in the unclamping state. FIG. 4B is a view similar to FIG. 4A, illustrating the detection member in a clamping state. FIG. 4C is a view similar to FIG. 4A, illustrating the detection member in an idly clamping state.

FIG. 11A is a perspective view of the detection member, and FIG. 11B is a section similar to FIG. 3.

DESCRIPTION OF THE REFERENCE NUMERALS

Figure 1:
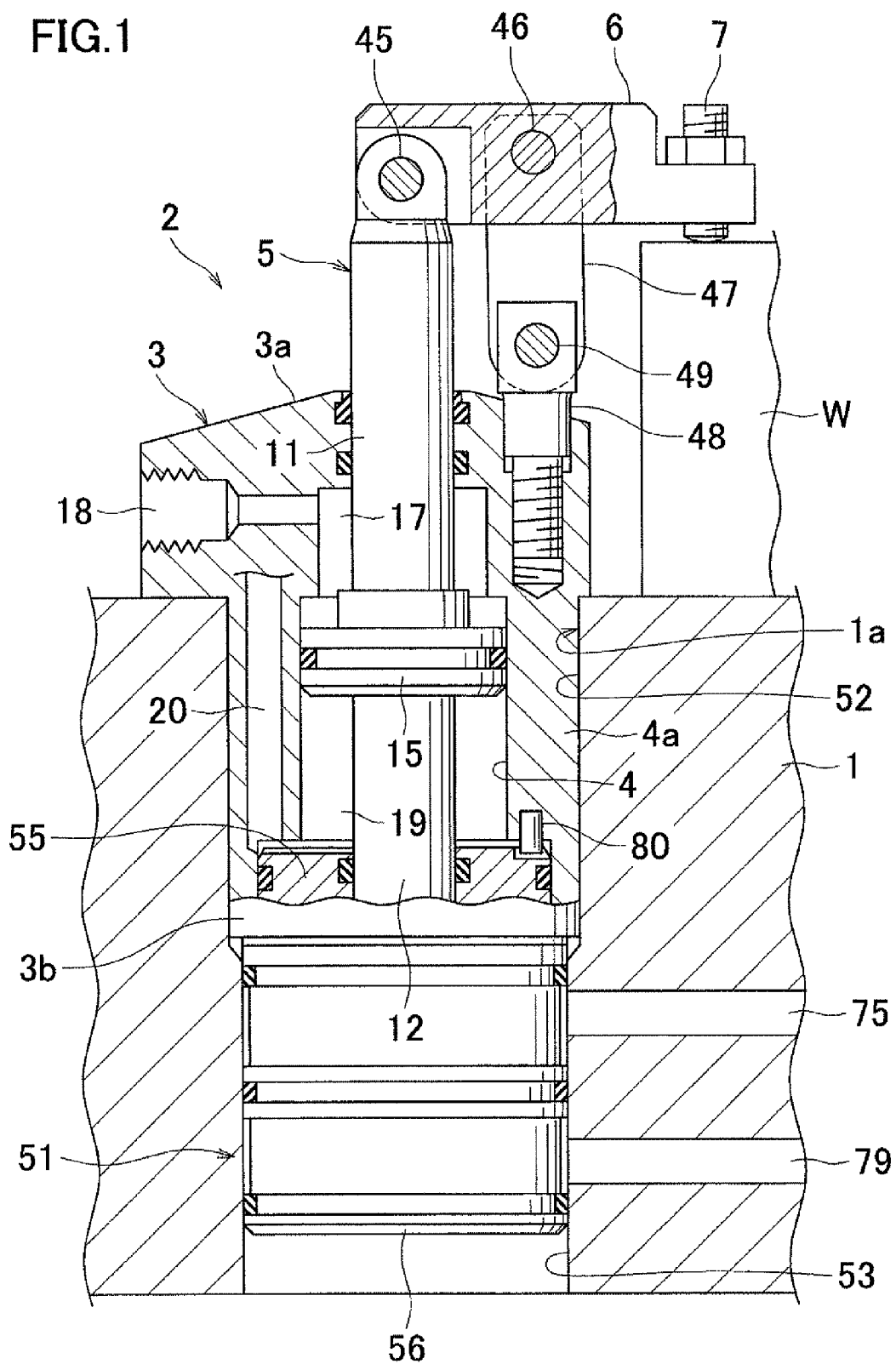
FIG. 1 is an elevational view partial in section of a link-type clamp, illustrating an embodiment of the present invention.

3: housing, 3b: one end wall (lower end wall) of housing 3, 5: clamp rod, 5a: operation portion (projecting portion), 58: detection hole, 62: detection member (collet), 68: closing surface, 69: communication portion (recessed portion), 71: inlet hole (first inlet hole), 71a: opening portion, 72: inlet hole (second inlet hole), 72a: opening portion, 91: elastic member

BEST MODE FOR CARRYING OUT THE INVENTION

FIG. 1 to FIG. 5 illustrate an embodiment of the present invention, and exemplify a case where the present invention is applied to a link-type clamp. First, using an elevational view partial in section of FIG. 1, an explanation will be made for a whole structure of the clamp.

A housing 3 of the clamp 2 is inserted into a mounting hole 1a of a table 1 of a machine tool, and the housing 3 is fixed onto an upper surface of the table 1 by a plurality of bolts (not shown). A clamp rod 5 is inserted into a cylindrical hole 4 of the housing 3. To an upper portion of the clamp rod 5, a left portion in a longitudinal direction of an arm 6 is connected by a first pin 45 so as to be swingable in a vertical plane. A portion of the arm 6 between both ends thereof in the longitudinal direction is swingably connected by a second pin 46 to upper portions of a pair of link members 47 (only one of the link members 47 is illustrated here). Furthermore, lower portions of the link members 47 are swingably connected by a third pin 49 to a head portion of a bolt 48 screwed into an upper end wall 3a of the housing 3. In addition, to a leading end portion of the arm 6, a push bolt 7 is fixed.

An upper slide portion 11 of the clamp rod 5 is slidably supported by the upper end wall 3a of the housing 3 in a hermetical manner. In a lower end wall (one end wall) 3b of the housing 3, a closure member 55 is fixed, and by the closure member 55, a lower slide portion 12 of the clamp rod 5 is slidably supported.

Meanwhile, a means for driving the clamp rod 5 is constructed as follows. A piston 15 is fixed to a medium height portion of the clamp rod 5, between the upper slide portion 11 and the lower slide portion 12. The piston 15 is hermetically inserted into the cylindrical hole 4.

Between the upper end wall 3a and the piston 15, an unclamp chamber 17 is formed, and pressurized oil can be supplied to/discharged from the unclamp chamber 17, through an unclamp-use pressurized oil supply and discharge port 18. In addition, between the lower end wall (one end wall) 3b and the piston 15, a clamp chamber 19 is formed. Pressurized oil can be supplied to/discharged from the clamp chamber 19 through a clamp-use pressurized oil supply and discharge port (not shown) and an oil passage 20.

The clamp 2 operates as follows. For clamping as shown in FIG. 1, pressurized oil in the unclamp chamber 17 is discharged, and pressurized oil is supplied to the clamp chamber 19. Thereby, the clamp rod 5 ascends to drive the arm 6 in a clockwise direction around the second pin 46, so that the push bolt 7 provided at a right portion of the arm 6 presses a workpiece W downward. On the other hand, for unclamping, pressurized oil in the clamp chamber 19 is discharged and pressurized oil is supplied to the unclamp chamber 17. Then, the clamp rod 5 descends to retreat the arm 6 in a counterclockwise direction.

There is provided a device for detecting an operating state of the clamp 2 having the above-described structure. Such an operation detecting device 51 will be described using FIG. 2 to FIG. 5C, with reference to FIG. 1.

The mounting hole 1a of the table 1 has a larger diameter hole 52 and a smaller diameter hole 53 which are formed vertically in this order. The lower end wall (one end wall) 3b of the housing 3 includes: the closure member 55 hermetically screwed into a peripheral wall 4a of the cylindrical hole 4; and a cylindrical member 56 fixed to the closure member 55 by a plurality of bolts 54 (only one of which is illustrated here). The cylindrical member 56 is hermetically inserted into the smaller diameter hole 53. In addition, the cylindrical member 56 is arranged substantially concentrically with an axis of the clamp rod 5, and an inner peripheral surface of the cylindrical member 56 forms a detection hole 58. A lower end of the detection hole 58 is communicatively connected to outside air through an outlet hole 60 of a cover plate 59.

A downward projecting portion (operation portion) 5a of the clamp rod 5 is hermetically inserted into the closure member 55. A lower portion of the projecting portion 5a is connected to a cylindrical detection member 62 through a support bolt 63 in such a manner that a relative movement in a radial and vertical direction is allowed but relative rotation around an axis is blocked. The detection member 62 is fitted into the detection hole 58 vertically movably.

Figure 3:
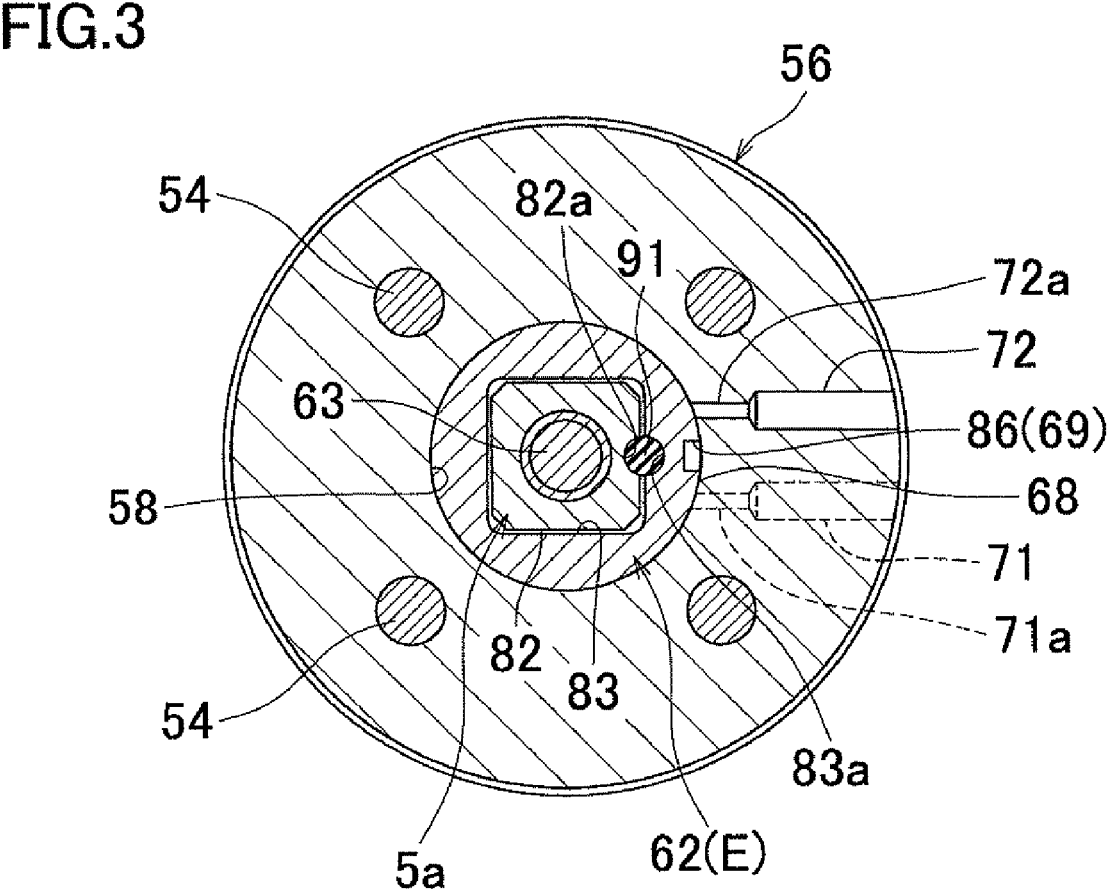
FIG. 3 is a section taken along the line of FIG. 2.
Figure 5A:
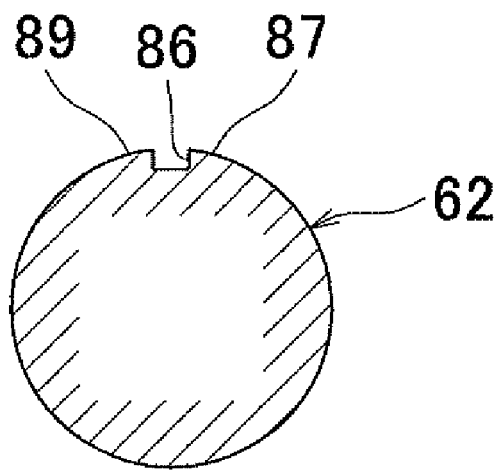
FIG. 5A is a view corresponding to a section taken along the line 5A-5A of FIG. 4A.
Figure 5B:
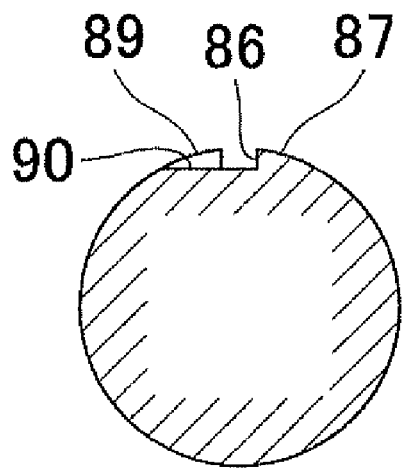
FIG. 5B is a view corresponding to a section taken along the line 5B-5B of FIG. 4A.
Figure 5C:
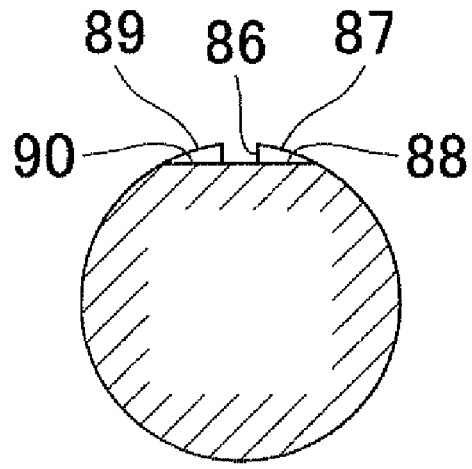
FIG. 5C is a view corresponding to a section taken along the line 5C-5C of FIG. 4A.

To be more specific, as mainly illustrated in FIG. 3, the lower portion of the projecting portion 5a has a squarish shaped outer peripheral surface 82, and the detection member 62 has a squarish shaped tubular hole 83 opened therein. The squarish shaped tubular hole 83 is fitted at the outside of the squarish shaped outer peripheral surface 82 with a predetermined gap therebetween. In addition, the detection member 62 is vertically movable between a lower portion of the support bolt 63 inserted into the tubular hole 83 and an under surface of the projecting portion 5a. Reference numeral 84 represents a spacer.

As mainly illustrated in FIG. 4A to FIG. 4C and FIG. 5A to FIG. 5C, a closing surface 68 and a recessed portion (communication portion) 69 is provided in an outer peripheral surface of the detection member 62. More specifically, the detection member 62 has a communication groove 86 having openings in upper and lower end surfaces of the detection member 62, respectively. On one outer side of the communication groove 86 (right outer side in FIG. 4A), a first closing surface 87 for detecting a clamping state and a first escape groove 88 are loaned vertically in this order, and on the other outer side of the communication groove 86 (left outer side in FIG. 4A), a second closing surface 89 for detecting unclamping state and a second escape groove 90 are formed vertically in this order. The first closing surface 87 and the second closing surface 89 constitute the closing surface 68, and the communication groove 86, the first escape groove 88, and the second escape groove 90 constitute the recessed portion (communication portion) 69.

Figure 2:
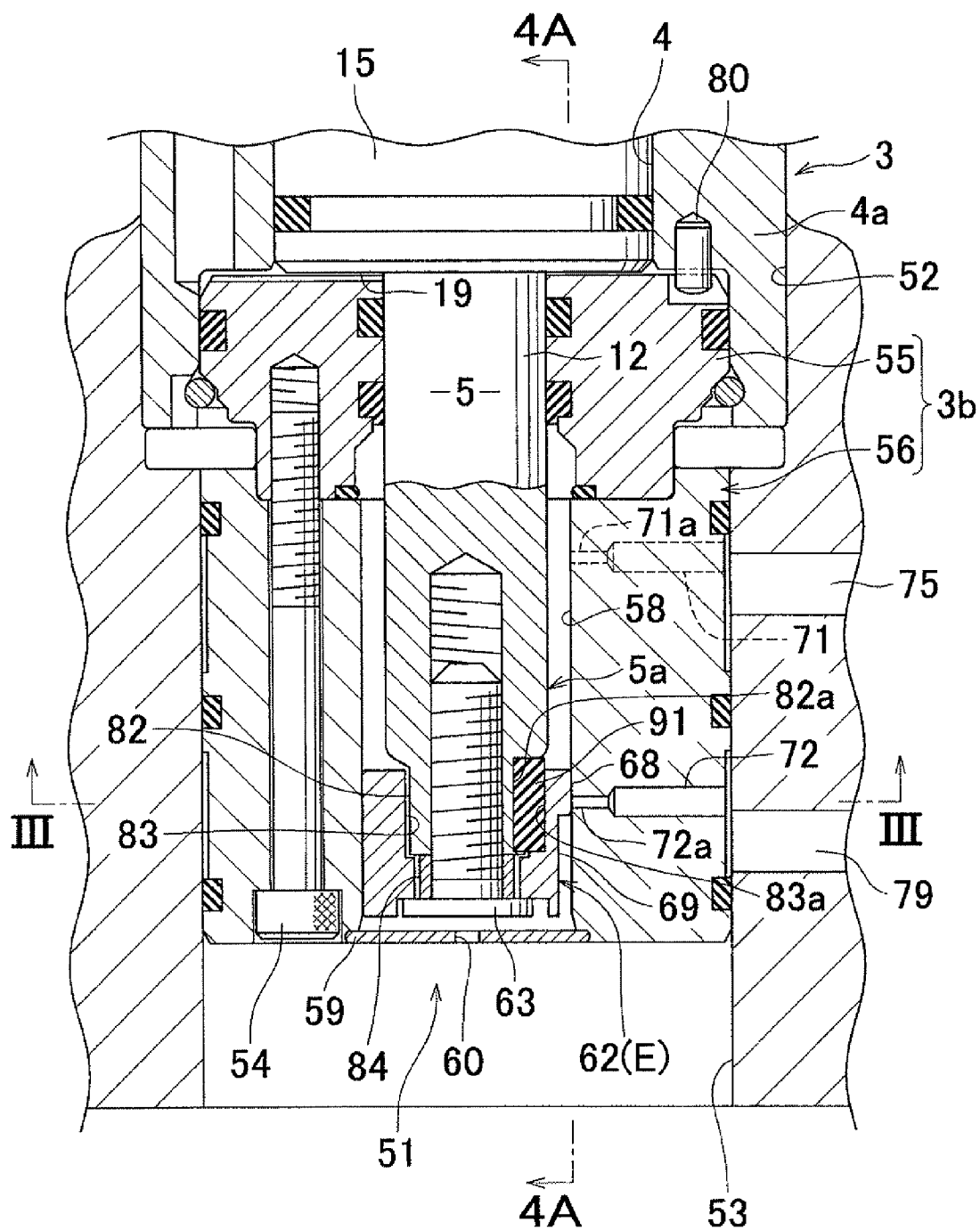
FIG. 2 is a section of an operation detecting device in an unclamping state, which is provided to the link-type clamp.

The detection hole 58 has a first inlet hole 71 for detecting the clamping state and a second inlet hole 72 for detecting the unclamping state, which are opened with a vertical spacing and a predetermined horizontal spacing therebetween (see FIG. 2 and FIG. 3). The first inlet hole 71 is connected to a supply source of compressed air (not shown) via a first supply port 75 of the table 1, and the second inlet hole 72 is also connected to the supply source of compressed air via a second supply port 79 of the table 1.

In addition, a recess 82a having a semicircular shape in a plan view is formed in an area of the outer peripheral surface 82 of the lower portion of the projecting portion 5a, which area is adjacent to opening portions 71a, 72a. Moreover, in an inner peripheral surface of the tubular hole 83 of the detection member 62, a semicircular recess 83a is formed so as to face the recess 82a. Between the recess 82a and the recess 83a, a columnar elastic member 91 made of rubber is arranged. Therefore, the detection member 62 is urged laterally toward the opening portions 71a, 72a by an urging force of the elastic member 91. That is, when the closing surface 68 of the detection member 62 faces the opening portion 71a, 72a, the closing surface 68 is pressed in a direction to close the opening portion 71a, 72a. Here, it is preferable that, the urging force of the elastic member 91 which presses the detection member 62 laterally toward the opening portion 71a, 72a is set to a value greater than a value of a pressure force of pressurized fluid, acting from the opening portion 71a, 72a onto the closing surface 68, and thereby, the closing surface 68 is brought into contact with the detection hole 58. In addition, the elastic member 91 may be made of plastic or may be a flat spring or the like, instead of rubber mentioned by way of example.

Further, such a recess for accommodating the elastic member 91 may be formed in, either the outer peripheral surface 82 of the lower portion of the projecting portion 5a, or the tubular hole 83 of the detection member 62. In addition, the elastic member 91 may be formed into a prism, instead of a columnar.

Incidentally, in the case where pressure of the pressurized fluid supplied from the opening portion 71a, 72a is 2 kgf/cm² and the diameter of the opening portion 71a, 72a is 1 mm, it is preferable that an urging force F of the elastic member 91 required for one opening portion is set to a value greater than a value obtained according to the following equation.

$$F = \pi \times [0.1\ (\text{cm})]^2 \times [\tfrac{1}{4}] \times 2(\text{kgf/cm}^2) \approx 16\ \text{gf}$$

The operation detecting device 51 having the above-described structure operates as follows. When the clamp rod 5 is in the unclamping state, as illustrated in FIG. 2 and FIG. 4A, the detection member 62 is at an unclamping position E and the second closing surface 89 of the detection member 62 closes the second opening portion 72a of the second inlet hole 72. This maintains pressure of compressed air supplied to the second inlet hole 72 at a set pressure, and thereby a second pressure switch (not shown) communicatively connected to the second inlet hole 72 detects that the detection member 62 is at the unclamping position E.

When the clamp rod 5 is upwardly driven for clamping, the detection member 62 which is at the unclamping position E in FIG. 4A ascends to a clamping position F in FIG. 4B, and the first closing surface 87 of the detection member 62 closes the first opening portion 71a of the first inlet hole 71. This maintains pressure of compressed air supplied to the first inlet hole 71 at a set pressure, and thereby a first pressure switch (not shown) communicatively connected to the first inlet hole 71 detects that the detection member 62 is at the clamping position F. In FIG. 4A to FIG. 4C, reference symbol J represents a clamping stroke, reference symbol K represents an additional stroke, and reference symbol L represents a whole stroke.

In the case where the arm 6 (see FIG. 1) performs idly clamping during the above-mentioned clamp-driving operation, due to erroneous attachment of the workpiece W (see FIG. 1) or the like, the detection member 62 ascends to an idly clamping position G in FIG. 4C. As a result, as illustrated in FIG. 4C, the first opening portion 71a of the first inlet hole 71 faces the first escape groove 88. Therefore, compressed air supplied to the first inlet hole 71 is discharged to an outside through the first opening portion 71a, the first escape groove 88, and the outlet hole 60 (see FIG. 2). This causes the pressure at the first inlet hole 71 to be lower than the set pressure, and thereby the first pressure switch (not shown) communicatively connected to first inlet hole 71 detects that the detection member 62 is at the idly clamping position G.

Further, in the case where, during the above-mentioned clamp-driving operation, the detection member 62 fails to ascend to the clamping position F in FIG. 4B for any reason and an upper end of the first closing surface 87 is located lower than the first opening portion 71a, compressed air supplied to the first inlet hole 71 is discharged to the outside through the first opening portion 71a, the communication groove 86, and the outlet hole 60 (see FIG. 2). This causes the pressure at the first inlet hole 71 to be lower than the set pressure, and thereby the first pressure switch (not shown) detects that the detection member 62 is not at the clamping position F.

Furthermore, in the case where: during the movement of the detection member 62 from the clamping position F in FIG. 4B to the unclamping position E in FIG. 4A, the detection member 62 fails to descend to the unclamping position E in FIG. 4A for any reason; and the second escape groove 90 faces the second opening portion 72a, compressed air supplied to the second inlet hole 72 is discharged to the outside through the second opening portion 72a, the second escape groove 90, and the outlet hole 60 (see FIG. 2). This causes the pressure at the second inlet hole 72 to be lower than the set pressure, and thereby the second pressure switch (not shown) detects that the detection member 62 is not at the unclamping position E.

FIG. 6 to FIG. 11B illustrate a first exemplary variation to a fourth exemplary variation of the above-described embodiment. In each of the exemplary variations, components identical (or similar) to those in the above embodiment will be designated and described by the same reference numerals, in principle.

Figure 6:
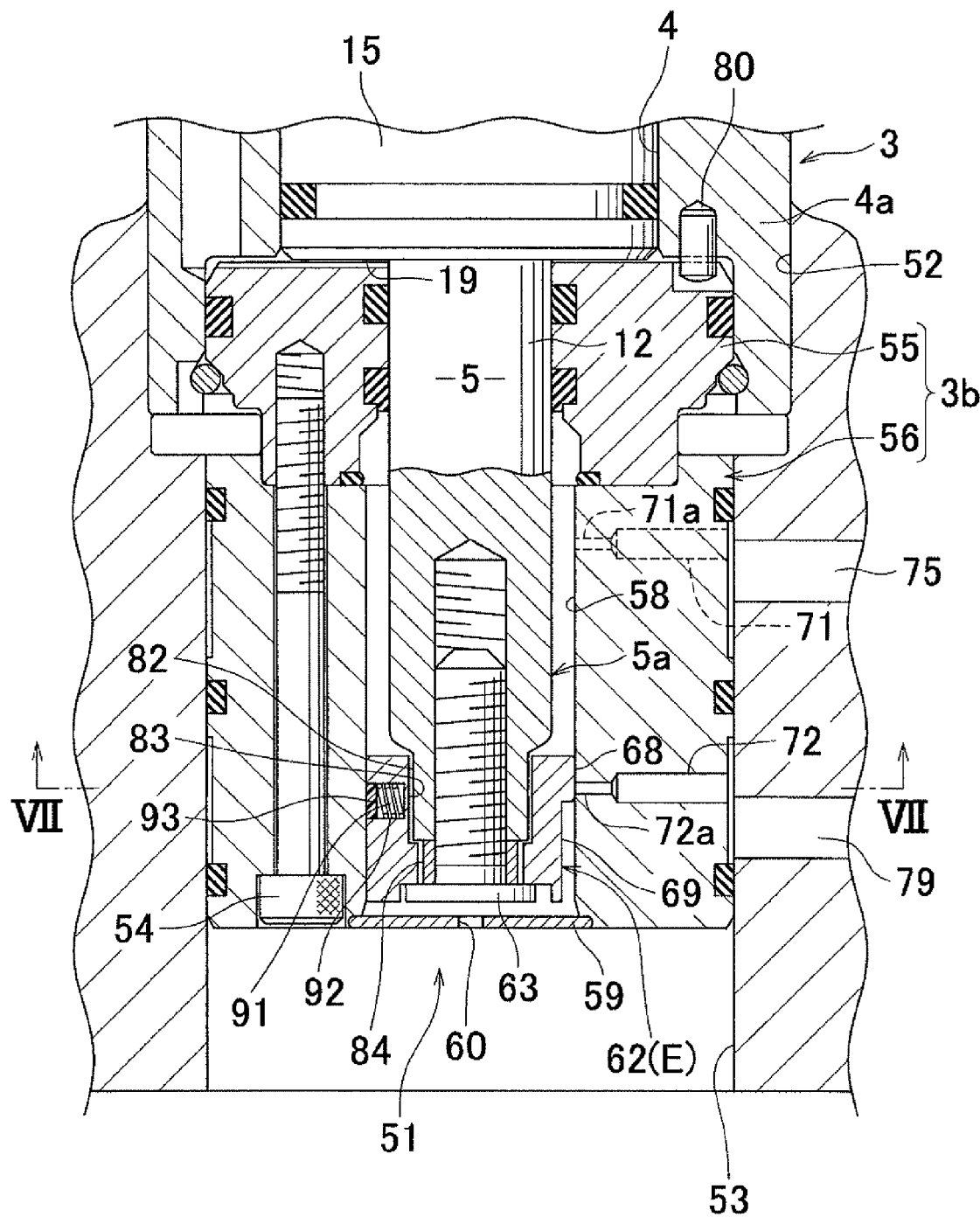
FIG. 6 is a section similar to FIG. 2, illustrating a first exemplary variation of the embodiment.
Figure 7:
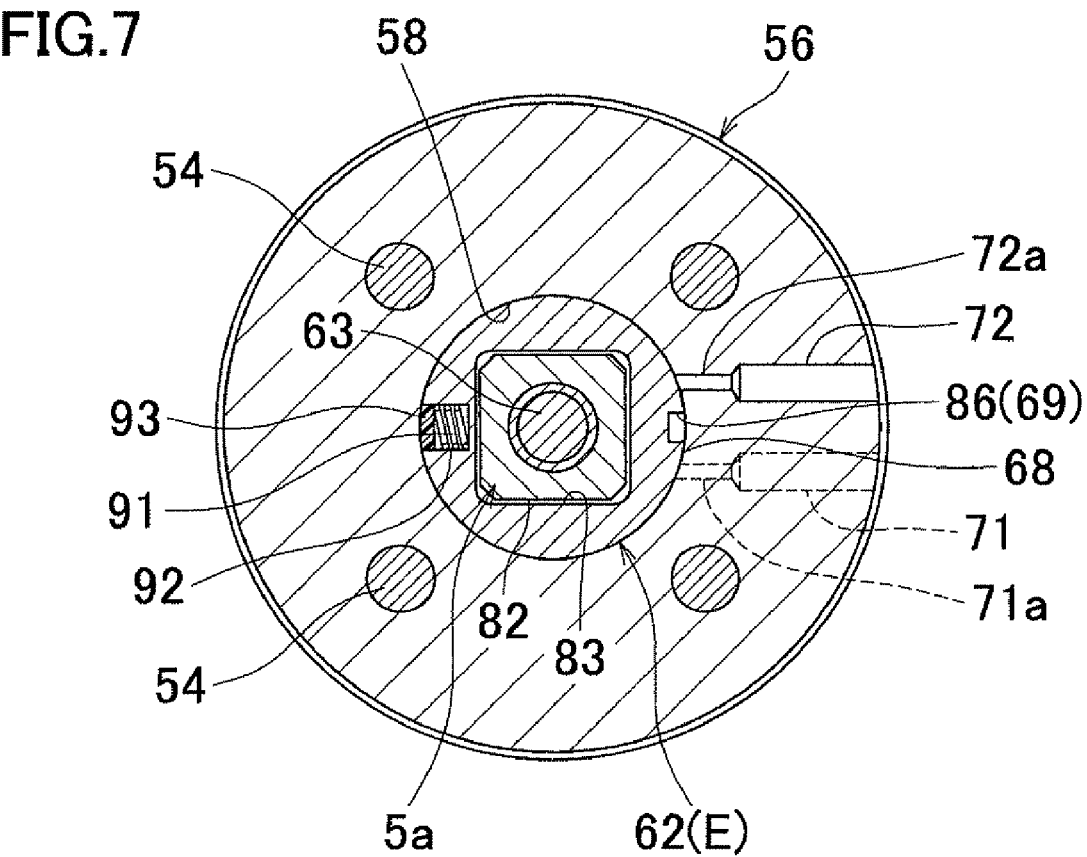
FIG. 7 is a section taken along the line VII-VII of FIG. 6.

FIG. 6 and FIG. 7 illustrate the first exemplary variation. FIG. 6 is a section similar to FIG. 2. FIG. 7 is a section taken along the line VII-VII of FIG. 6. In this variation, a recess 92 is opened in the outer peripheral surface of the detection member 62. The recess 92 is provided at a position in the outer peripheral surface of the detection member 62, the position opposite to the closing surface 68 and the recessed portion (communication portion) 69. That is, the recess 92 is provided opposite to the opening portion 71a, 72a, across the projecting portion 5a. Between a bottom surface of the recess 92 of the detection member 62 and a peripheral surface of the detection hole 58, an elastic member 91 made with a spring and a press member 93 made of plastic are arranged. The press member 93 is urged laterally by an urging force of the elastic member 91, radially outwardly from the bottom surface of the recess 92, and is pressed against the peripheral surface of the detection hole 58. Therefore, the detection member 62 is urged by the urging force of the elastic member 91 toward the opening portion 71a, 72a. Here, for the press member 93, used is a low-friction resin or the like such as Teflon or polyethylene, for example.

Figure 8:
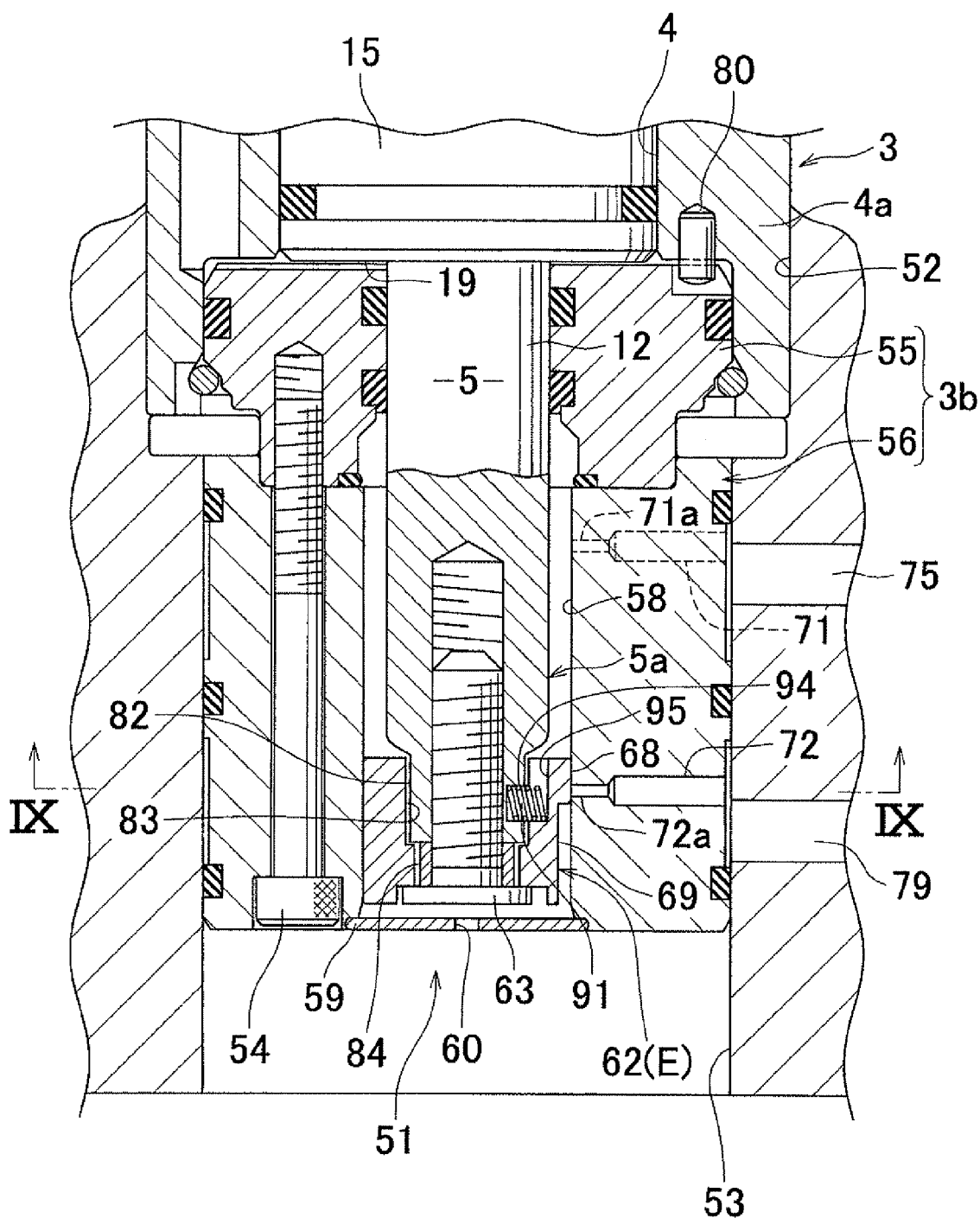
FIG. 8 is a section similar to FIG. 2, illustrating a second exemplary variation.
Figure 9:
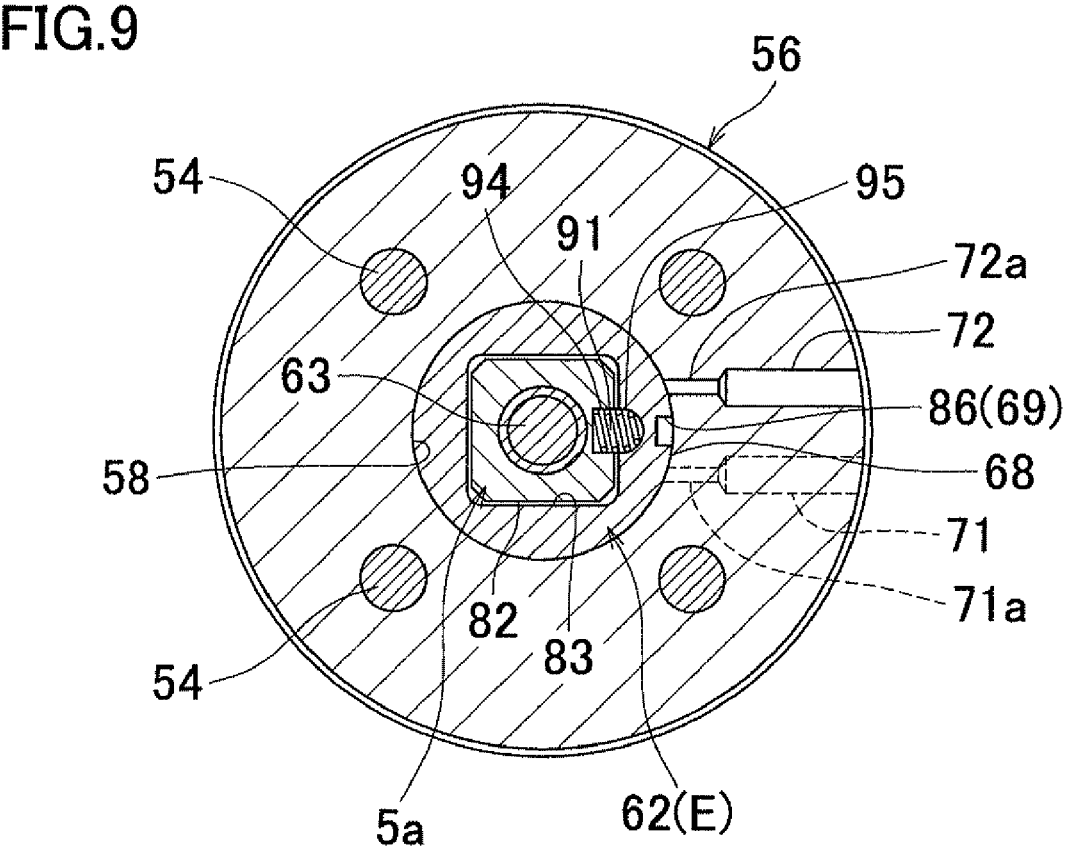
FIG. 9 is a section taken along the line IX-IX of FIG. 8.

FIG. 8 and FIG. 9 illustrate a second exemplary variation. FIG. 8 is a section similar to FIG. 2. FIG. 9 is a section taken along the line IX-IX of FIG. 8. In this variation, a recess 94 is formed in an area of the outer peripheral surface 82 of the lower portion of the projecting portion 5a, which area is adjacent to the opening portion 71a, 72a. Furthermore, a recess 95 is formed in the peripheral surface of the tubular hole 83 of the detection member 62 so as to face the recess 94. Between a bottom surface of the recess 94 of the projecting portion 5a and the recess 95 in the peripheral surface of the detection member 62, the elastic member 91 made with a spring is arranged. Therefore, the detection member 62 is urged by the urging force of the elastic member 91 toward the opening portion 71a, 72a.

Figure 10:
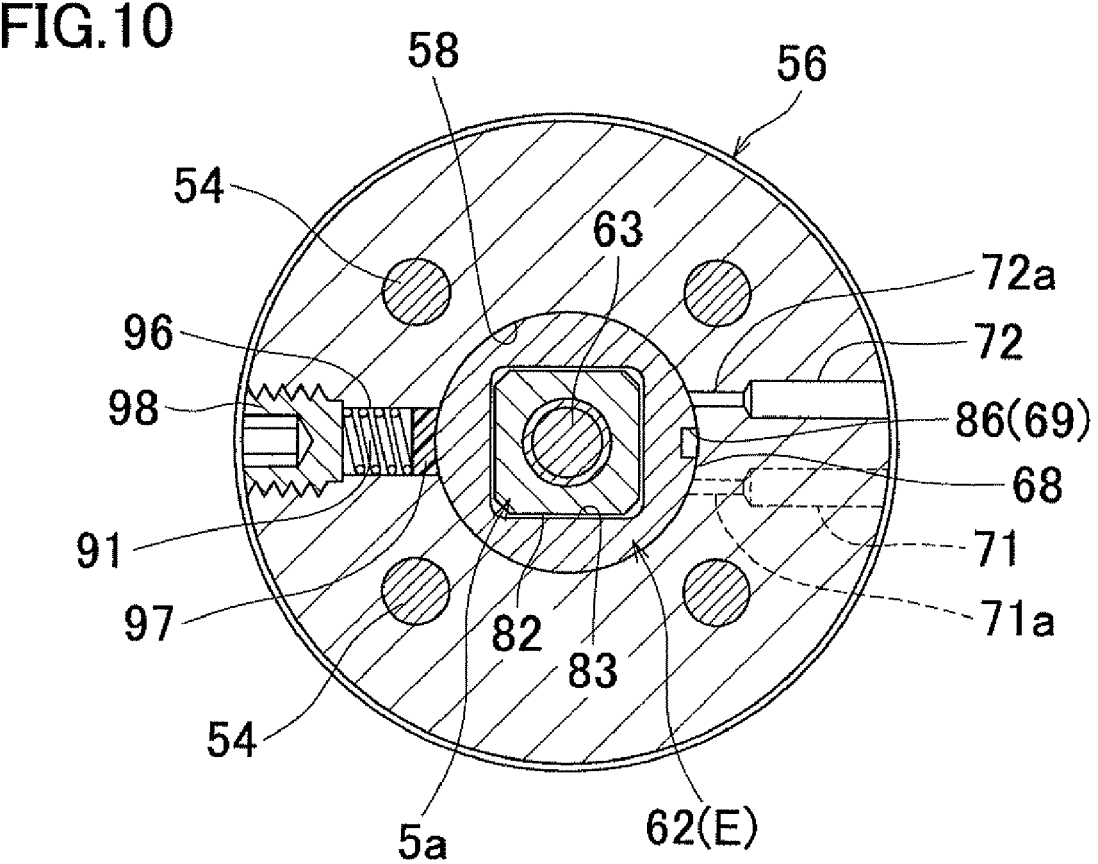
FIG. 10 is a section similar to FIG. 3, illustrating a third exemplary variation.

FIG. 10 is a section similar to FIG. 3, illustrating a third exemplary variation. In this variation, a horizontally extending through hole 96 is opened in the cylindrical member 56. The through hole 96 is provided at a position opposite to the opening portion 71a, 72a across the projecting portion 5a. An outer end of the through hole 96 is closed with a closing bolt 98, and the elastic member 91 made with a spring and a press member 97 are arranged in the through hole 96. That is, the elastic member 91 and the press member 97 are arranged between the closing bolt 98 and the outer peripheral surface of the detection member 62. The press member 97 is urged inwardly by an urging force of the elastic member 91, and is pressed against the outer peripheral surface of the detection member 62. Therefore, the detection member 62 is urged by the urging force of the elastic member 91 toward the opening portion 71a, 72a. Here, for the press member 97, a low-friction resin or the like is used, such as Teflon or polyethylene, for example. Since the press member 97 is pressed against the outer peripheral surface of the detection member 62 and thereby a friction force (braking force) generated between the press member 97 and the outer peripheral surface prevents an overrun of the detection member 62, the operating state of the clamp rod 5 is accurately detected. This is also applied to the first exemplary variation of FIG. 6 and FIG. 7.

Figure 11A:
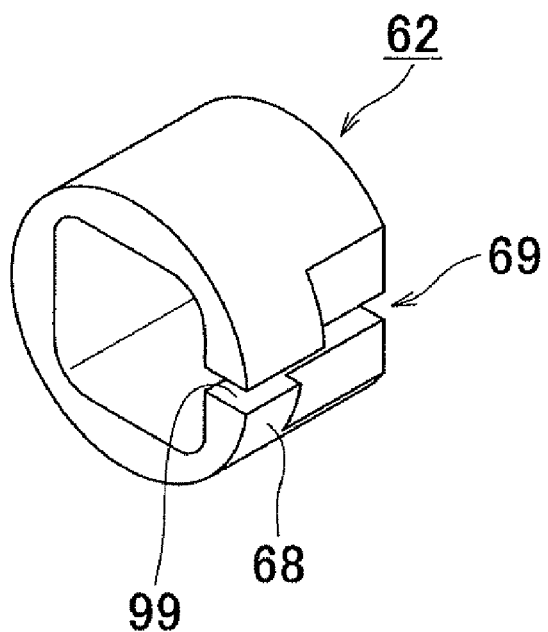
FIG. 11A and FIG. 11B illustrate a fourth exemplary variation.
Figure 11B:
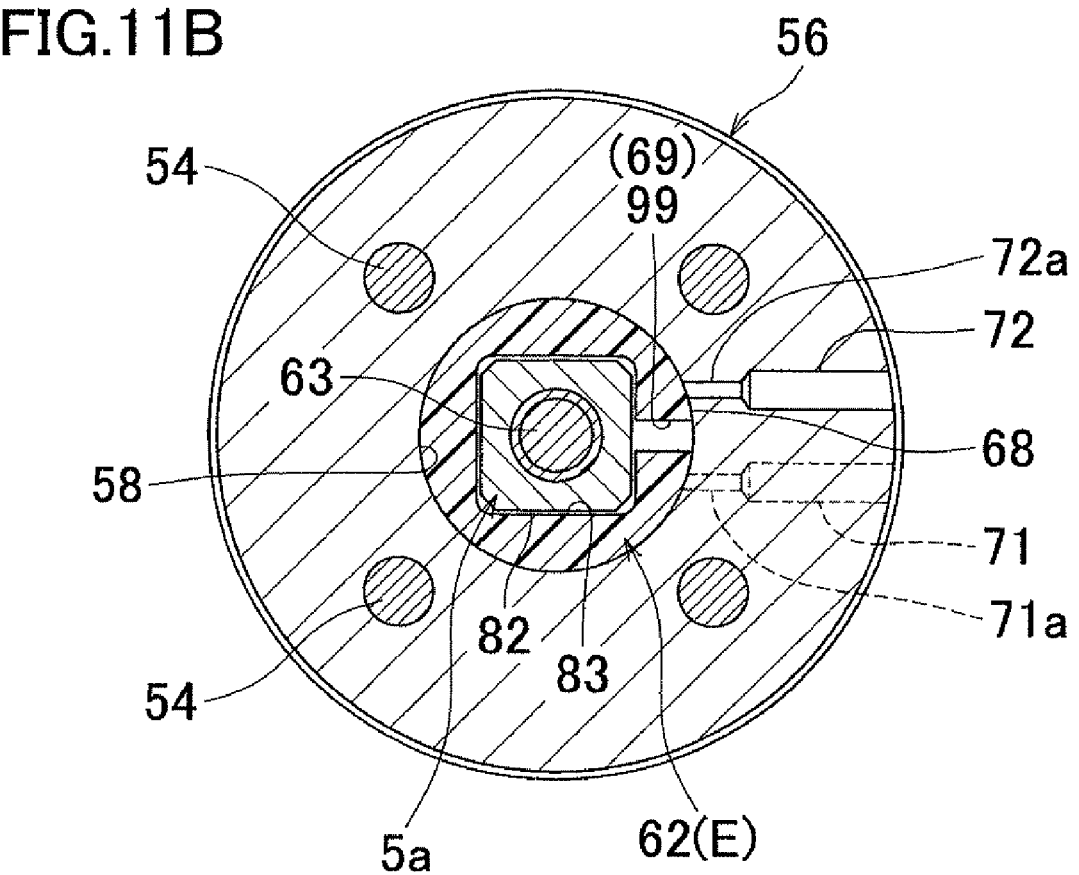

FIG. 11A and FIG. 11B illustrate the fourth exemplary variation. FIG. 11A is a perspective view of the detection member 62, and FIG. 11B is a section similar to FIG. 3. In this variation, the detection member 62 is composed of one annular collet made of synthetic resin, and has a slit 99 formed in a portion of the peripheral wall thereof, and this allows the detection member 62 to diametrically expand and contract. Here, the slit 99 constitutes a part of the communication portion 69.

In a normal state where the detection member 62 is diametrically expanded, an outer diameter of the detection member 62 is larger than an inner diameter of the detection hole 58. The detection member 62 is fitted into the detection hole 58 with the peripheral wall of the detection member 62 being diametrically contracted. Therefore, a force in a direction of diametrical expansion toward the opening portion 71a, 72a acts on the detection member 62, due to its own elastic restoring force. Here, it is preferable that, the force acting on the detection member 62 in the direction of diametrical expansion (elastic restoring force of the detection member 62) is set to a value greater than a value of a pressure force of pressurized fluid acting from the opening portion 71a, 72a to the closing surface 68, and thereby the closing surface 68 is brought into contact with the detection hole 58. Here, as a material of the detection member 62, a synthetic resin is mentioned by way of example; however, instead of this, the material may be steel, non-ferrous metal, special alloy, or the like, for example.

In addition, it is a matter of course that the detection member 62 composed of the annular collet does not have to have the shape mentioned by way of example, and various shapes can be applied thereto.

Incidentally, the outer peripheral surface 82 of the lower portion of the projecting portion 5a may be formed into a circular, and concurrently therewith, the tubular hole 83 of the detection member 62 may be formed into a circular. In this case, a pin (not shown) projected radially outwardly from the projecting portion 5a may be inserted into the slit 99 of the detection member 62, to prevent the detection member 62 from rotating.

Further, in the fourth exemplary variation, the slit 99 may be formed at any position in the peripheral wall of the annular detection member 62, as long as the slit 99 does not overlap the opening portion 71a, 72a.

The above-described embodiment and exemplary variations bring about the following advantages.

The detection member 62 is urged by the elastic member 91 toward the opening portion 71a, 72a, or a force to push the closing surface 68 toward the opening portion 71a, 72a acts on the detection member 62, due to its own elastic restoring force. Because of this, even when at least one of the closing surface 68 of the detection member 62 and an inner periphery of the detection hole 58 is worn, there is very little or substantially no gap formed between the closing surface 68 and a vicinity of the opening portion 71a, 72a in the peripheral surface of the detection hole 58, and the pressure detected with the opening portion 71a, 72a of the inlet hole 71, 72 being closed is kept high, and therefore, the operating state of the clamp rod 5 can be accurately identified.

Moreover, since there is very little or substantially no gap formed between the closing surface 68 of the detection member 62 and the vicinity of the opening portion 71a, 72a in the peripheral surface of the detection hole 58, it is possible to keep the pressure high, which is detected in a state where the opening portion 71a, 72a of the inlet hole 71, 72 being closed, without exerting strict control on component tolerance at the time of manufacturing components. Therefore, the operating state of the clamp rod 5 can be accurately identified.

Thus, it is possible to accurately detect the operating state of the clamp rod 5 in a manner consistent with prevention of increase in machining cost.

Moreover, the urging force of the elastic member 91 which presses the detection member 62 toward the opening portion 71a, 72a is set to a value greater than a value of a pressure force of the pressurized fluid acting from the opening portion 71a, 72a onto the closing surface 68, and thereby the closing surface 68 is brought into contact with the detection hole 58, so that the detection member 62 is smoothly movable while being pressed toward the opening portion 71a, 72a. In addition, similar effects can be obtained also in the above-described case where: the detection member 62 is an annular collet; the elastic restoring force of the detection member 62 is set to a value greater than a value of a pressure force of the pressurized fluid acting from the opening portion 71a, 72a onto the closing surface 68; and thereby the closing surface 68 is brought into contact with the detection hole 58.

Further, the embodiment and the exemplary variations may be modified as follows. It is matter of course that the closing surface 68 and the recessed portion (communication portion) 69 do not have to have the shapes mentioned by way of example respectively, and various shapes are applicable thereto. Incidentally, the communication portion through which the opening portion 71a, 72a is communicatively connected to outside air may be provided in the peripheral wall of the detection member 62, instead of providing it on the outer peripheral surface of the detection member 62. Further, as for the first inlet hole 71 and the second inlet hole 72, only either one of the inlet holes may be provided, instead of providing both of them. Fluid supplied to/discharged from the clamp chamber 17 or the unclamp chamber 19 may be other kinds of liquid or gas such as air, instead of pressurized oil.

In addition, the operation detecting device according to the present invention is applicable to a swing clamp (rotary-type clamp), or other types of actuators, instead of applying the device to a link-type clamp.

What is claimed is:

1. An operation detecting device of a clamp comprising:
   a clamp rod (5) axially movably inserted into a housing (3);
   a detection hole (58) formed in one end wall (3b) of the housing (3) substantially concentrically with an axis of the clamp rod (5);
   an inlet hole (71, 72) for supplying pressurized fluid opened in a peripheral surface of the detection hole (58);
   a detection member (62) axially movably fitted into the detection hole (58), the detection member (62) being movable laterally relative to the clamp rod (5), and having a closing surface (68) which laterally closes an opening portion (71a, 72a) of the inlet hole (71, 72) upon lateral movement of the detection member and a communication portion (69) through which the opening portion (71a, 72a) is communicatively connected to outside air; and
   an operation portion (5a) provided at one end portion of the clamp rod (5), the operation portion (5a) being connected to the detection member (62), and
   an elastic member (91) arranged to laterally urge the detection member and closing surface laterally relative to the clamp rod (5) toward the opening portion (71a, 72a).

2. The operation detecting device of a clamp according to claim 1, wherein
an urging force of the elastic member (91) is set to a value greater than a value of a pressure force of the pressurized fluid acting from the opening portion (71a, 72a) onto the closing surface (68), and thereby during operation the closing surface (68) is brought into contact with the detection hole (58) against the pressure force of the pressurized fluid.

3. An operation detecting device of a clamp comprising:
a clamp rod (5) axially movably inserted into a housing (3); a detection hole (58) formed in one end wall (3b) of the housing (3) substantially concentrically with an axis of the clamp rod (5); an inlet hole (71, 72) for supplying pressurized fluid opened in a peripheral surface of the detection hole (58);
a detection member (62) axially movably fitted into the detection hole (58), the detection member (62) having a closing surface (68) which closes an opening portion (71a, 72a) of the inlet hole (71, 72) and a communication portion (69) through which the opening portion (71a, 72a) is communicatively connected to outside air; and
an operation portion (5a) provided at one end portion of the clamp rod (5), the operation portion (5a) being connected to the detection member (62), wherein
the detection member (62) is a diametrically expandable and contractible collet, and is insertable into the detection hole (58) with the collet diametrically contracted, and the closing surface (68) is expandable toward the opening portion (71a, 72a) diametrically by a device applying an elastic restoring force, carried by the detection member (62) itself.

4. The operation detecting device of a clamp according to claim 3, wherein
the elastic restoring force of the detection member (62) is set to a value greater than a value of a pressure force of the pressurized fluid acting from the opening portion (71a, 72a) onto the closing surface (68), so that during operation the closing surface (68) is brought into contact with the detection hole (58) against the pressure force of the pressurized fluid.

* * * * *